US012022267B2

(12) United States Patent
Horiuchi

(10) Patent No.: US 12,022,267 B2
(45) Date of Patent: Jun. 25, 2024

(54) APPARATUS, METHOD AND COMPUTER-READABLE STORAGE MEDIUM FOR MIXING COLLECTED SOUND SIGNALS OF MICROPHONES

(71) Applicant: KDDI CORPORATION, Tokyo (JP)

(72) Inventor: Toshiharu Horiuchi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 155 days.

(21) Appl. No.: 17/885,825

(22) Filed: Aug. 11, 2022

(65) Prior Publication Data

US 2022/0394382 A1 Dec. 8, 2022

Related U.S. Application Data

(63) Continuation of application No. PCT/JP2021/005322, filed on Feb. 12, 2021.

(30) Foreign Application Priority Data

Feb. 18, 2020 (JP) .................................. 2020-025587

(51) Int. Cl.
*H04R 3/00* (2006.01)
*G06F 3/04845* (2022.01)

(52) U.S. Cl.
CPC .......... *H04R 3/005* (2013.01); *G06F 3/04845* (2013.01); *H04R 2430/23* (2013.01)

(58) Field of Classification Search
CPC ...... H04R 3/005; H04R 25/407; H04R 1/406; H04R 25/405; H04R 2430/20;

(Continued)

(56) References Cited

U.S. PATENT DOCUMENTS 10,951,984 B2 3/2021 Horiuchi
2017/0195815 A1* 7/2017 Christoph ............... H04S 7/303

FOREIGN PATENT DOCUMENTS

JP 3905364 B 4/2007
JP 2013-543987 A 12/2013

(Continued)

OTHER PUBLICATIONS

Chapter 2: "Sound Source Separation", vol. 6: "Acoustic Signal Processing", Group 2: "Images, Sounds, Languages", Forest of Knowledge, IEICE, at: http://www.ieice-hbkb.org/files/02/02gun_06hen_02.pdf (1 page).

(Continued)

*Primary Examiner* — Norman Yu
(74) *Attorney, Agent, or Firm* — Foley & Lardner LLP

(57) ABSTRACT

An apparatus comprising: one or more processors; and one or more memory devices configured to store one or more computer programs executable by the one or more processors. The one or more programs, when executed by the one or more processors, cause the apparatus to function as: a setting unit configured to set an angle section at a single sound collection position, selected by a user; a analysis unit configured to convert each of M collected sound signals into a frequency component; a beamforming unit configured to multiply M frequency components obtained through conversion by the analysis unit by respective beamforming matrices to generate a plurality of acoustic signals of two channels; and a signal generation unit configured to synthesize the acoustic signals per channel and outputting an acoustic signal for every channel.

9 Claims, 11 Drawing Sheets

(58) Field of Classification Search
CPC .............. H04R 2430/23; H04R 29/005; H04R 2430/03; H04R 1/32; H04R 1/222; H04R 1/22
USPC ............................... 381/313, 80, 92, 122, 74
See application file for complete search history.

(56) References Cited

FOREIGN PATENT DOCUMENTS

| JP | 2017-123650 A | 7/2017 |
| JP | 2018-019294 A | 2/2018 |
| JP | 2019-068210 A | 4/2019 |

OTHER PUBLICATIONS

Insta360 Pro2, https://hacosco.com/insta360-pro2/ (1 page).
ZYLIA ZM-1 microphone (multitrack recording microphone array), https://www.minet.jp/brand/zylia/zylia-music-set/ (1 page).

* cited by examiner

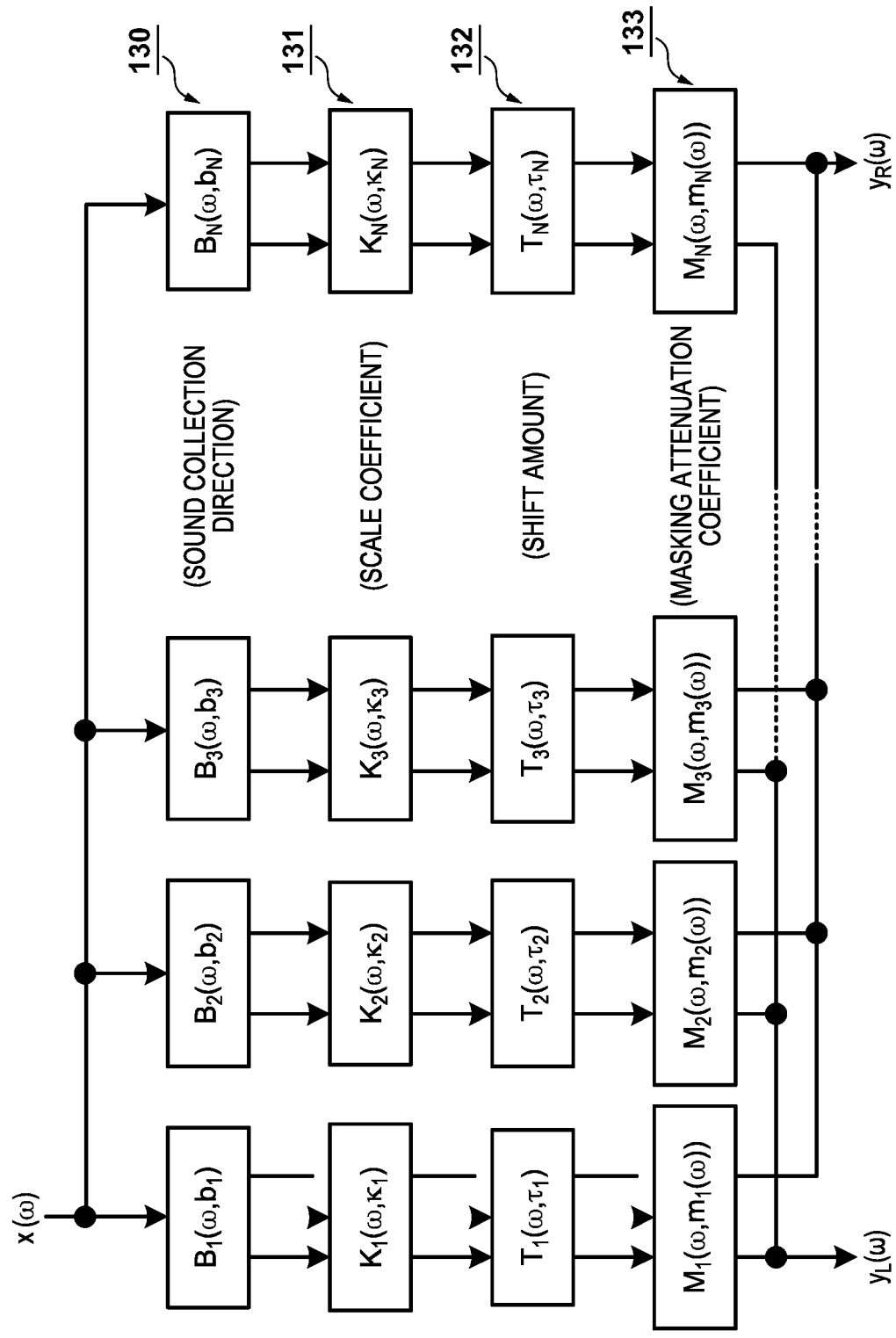

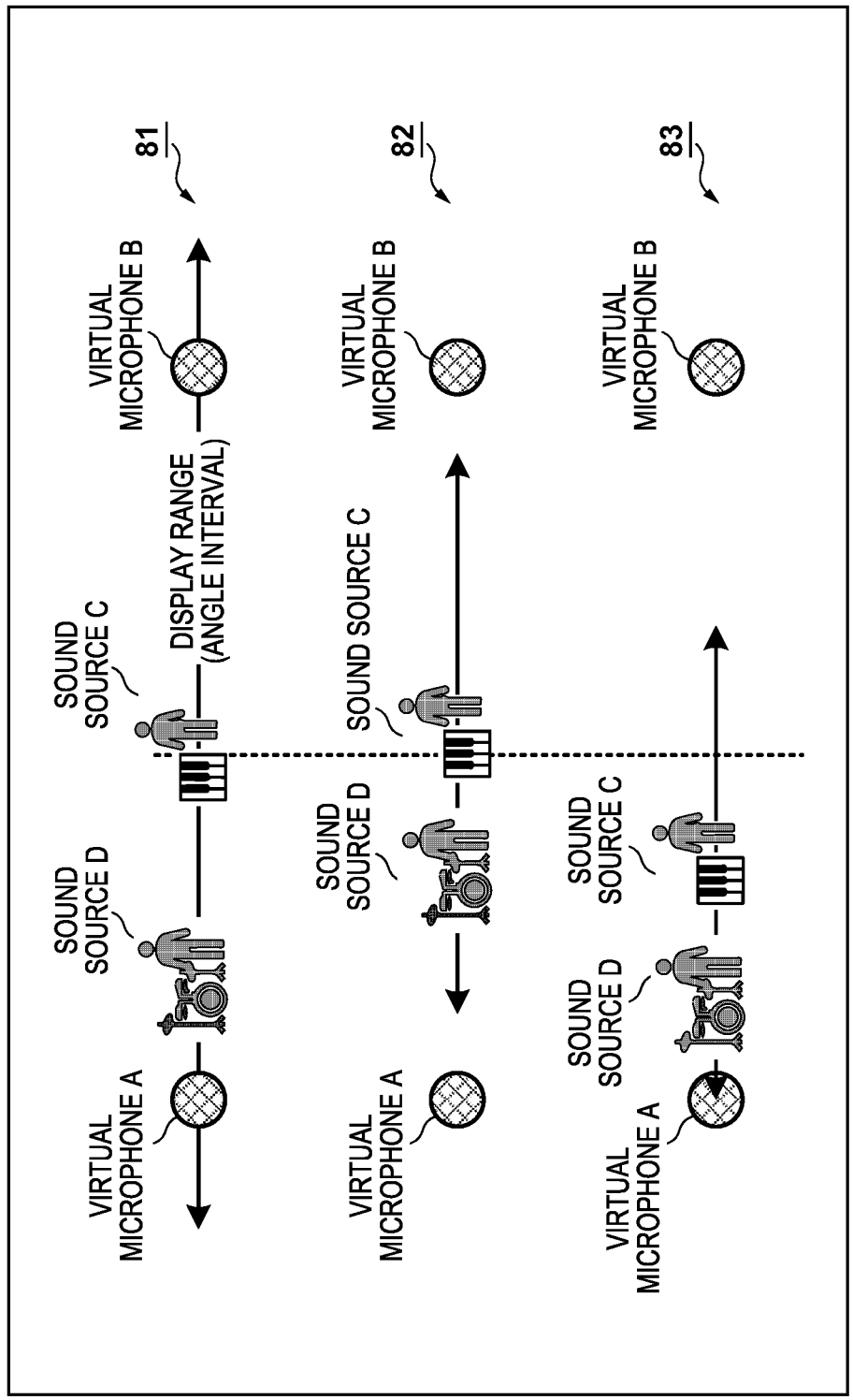

APPARATUS, METHOD AND COMPUTER-READABLE STORAGE MEDIUM FOR MIXING COLLECTED SOUND SIGNALS OF MICROPHONES

CROSS-REFERENCE TO RELATED APPLICATION(S)

This application is a continuation of International Patent Application No. PCT/JP2021/005322 filed on Feb. 12, 2021, which claims priority to and the benefit of Japanese Patent Application No. 2020-025587 filed on Feb. 18, 2020, the entire disclosures of which are incorporated herein by reference.

BACKGROUND OF THE INVENTION

Field of the Invention

The present invention relates to a technique for mixing collected sound signals collected by a plurality of microphones.

Description of the Related Art

In recent years, interactive viewing for users has been generating interest, due to advances in VR (Virtual Reality) and AR (Augmented Reality) technologies. For example, when playing an omnidirectional (360-degree) moving image, the user himself or herself is able to selectively designate the angle of the field of view (angle interval within 360 degrees) and display the moving image on a display at that angle of view. Also, sound collected omnidirectionally through 360 degrees is played while playing the omnidirectional moving image. In this playback, an Ambisonics system, a binaural system or a surround system is generally used for omnidirectional composition of sound fields.

FIG. 1 is an illustrative diagram showing the directionality of a conventional circular microphone array.

The conventional circular microphone array collects sound with a plurality of directional microphones facing in different directions. As shown in FIG. 1, musical performers are positioned in a circle, and a circular microphone array is disposed in the center thereof. By collecting sound with the directional microphones each facing a different performer, the sound of the performance of each performer can be collected.

There are technologies for mixing acoustic signals collected by a plurality of microphones. PTL 1 discloses a stereo width control technique for adjusting (widening or narrowing) the width of the sound field range with respect to the acoustic signals collected by two microphones. According to PTL 1, two acoustic signals of a right channel and a left channel are generated from the collected sound signals of the two microphones, based on the expansion ratio of the sound field. The sound field range is adjusted by driving a set of stereo speakers with these two acoustic signals.

Also, PTL 2 discloses a stereo width control technique for acoustic signals collected by three or more microphones.

CITATION LIST

Patent Literature

PTL 1: Japanese Patent No. 3905364
PTL 2: Japanese Patent Laid-Open No. 2019-068210

Non-Patent Literature

NPL 1: Chapter 2: "Sound Source Separation", Volume 6: "Acoustic Signal Processing", Group 2: "Images, Sounds, Languages", Forest of Knowledge, IEICE, accessed on Feb. 15, 2020, at: http://www.ieice-hbk-b.org/files/02/02gun_06hen_02.pdf
NPL 2: ZYLIA ZM-1 microphone (multitrack recording microphone array), accessed on Feb. 16, 2020, at: https://www.minet.jp/brand/zylia/zylia-music-set/
NPL 3: Insta360 Pro2, accessed on Feb. 16, 2020, at: https://hacosco.com/insta360-pro2/

When collected sound signals collected by a plurality of microphones are mixed directly, the collected sound signals are output at the same level from the speakers. In this case, even if the user is looking at the violin player, for example, the sound of the violin will be heard at the same level as the sounds of the other instruments. Thus, the user senses a divergence between the video image range that he or she is viewing and the sound field range.

SUMMARY OF THE INVENTION

The present disclosure provides a technique for mixing collected sound signals of a plurality of microphones, such that the user does not sense a divergence between the visual video image range and the auditory sound field range.

According to an aspect of the present invention, an apparatus for mixing collected sound signals, comprising: one or more processors; and one or more memory devices configured to store M collected sound signals, each of which is collected by a microphone of M microphones, and one or more computer programs executable by the one or more processors, M being 2 or more. The one or more programs, when executed by the one or more processors, cause the apparatus to function as: an angle section setting unit configured to set an angle section at a single sound collection position, selected by a user; a frequency analysis unit configured to convert each of the M collected sound signals into a frequency component; a beamforming unit configured to multiply M frequency components obtained through conversion by the frequency analysis unit by respective beamforming matrices to generate a plurality of acoustic signals of two channels; and a synthesized acoustic signal generation unit configured to synthesize the acoustic signals per channel and outputting an acoustic signal for every channel.

According to the present disclosure, collected sound signals of a plurality of microphones can be mixed, such that the user does not sense a divergence between the visual video image range and the auditory sound field range.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

FIG. 7 is a second schematic diagram showing the relationship between input acoustic signals and stereo acoustic signals.

FIG. 8 is an illustrative diagram showing the positional relationship between virtual microphones and sound sources.

DESCRIPTION OF THE EMBODIMENTS

Figure 1:
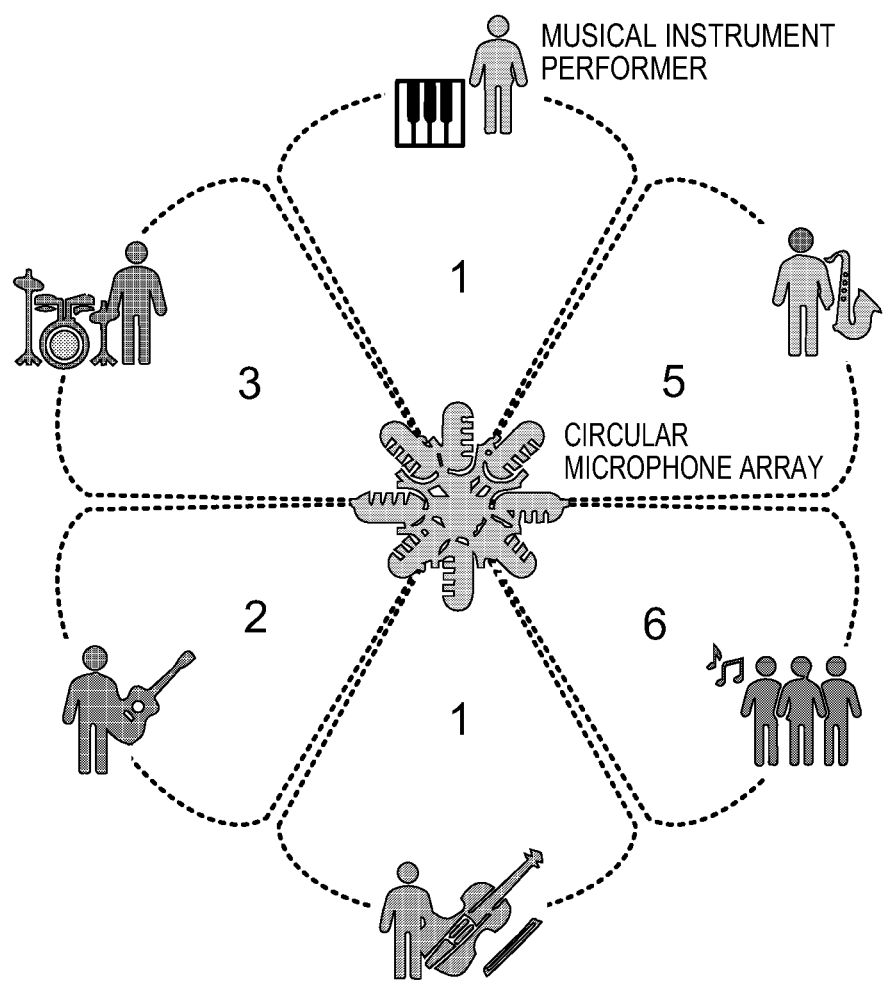
FIG. 1 is an illustrative diagram showing the directionality of a conventional circular microphone array.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 2:
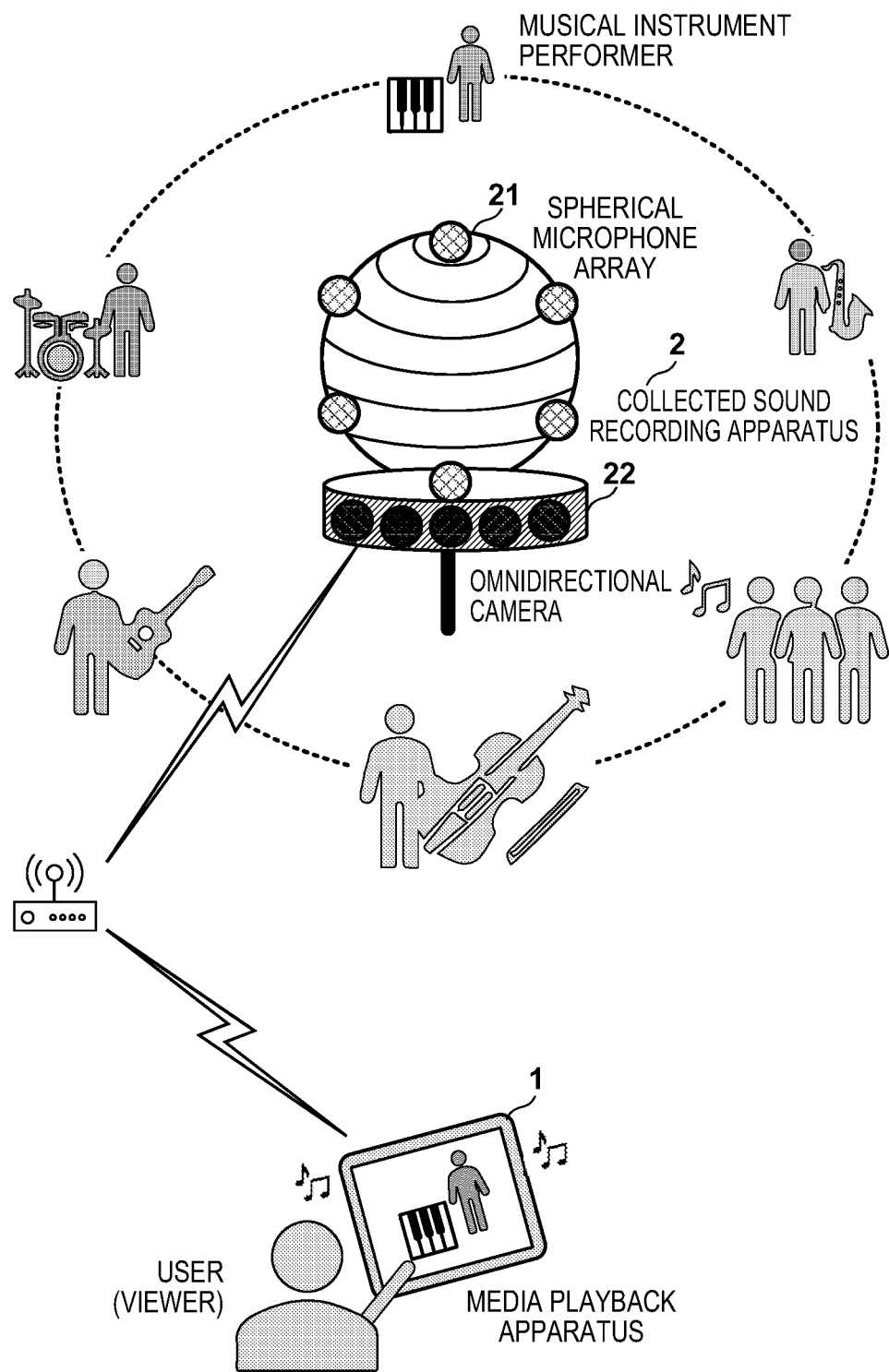
FIG. 2 is a configuration diagram of a system constituted by a media playback apparatus and a collected sound recording apparatus of the present invention.

FIG. 2 is a configuration diagram of a system constituted by a media playback apparatus and a collected sound recording apparatus of the present embodiment.

Sound Recording Apparatus 2

A collected sound recording apparatus 2 includes a spherical microphone array 21 and an omnidirectional camera 22.

Spherical Microphone Array 21

In the spherical microphone array 21, a plurality of (M) microphones are geometrically arranges to enable sound to be collected from different directions (see NPL 2). The geometrically arranged microphones are not limited to being arranged equidistantly from each other. Also, the microphones that are installed in the spherical microphone array 21 may be non-directional or directional.

As shown in FIG. 2, the microphones in the spherical microphone array 21 are disposed on a spherical surface and collect sound omnidirectionally. Naturally, the microphone array need not necessarily be spherical, and the microphones may be disposed three-dimensionally or may be disposed two-dimensionally on a flat surface. Also, the microphones need not be disposed on a spherical surface or in a circle, and may, for example, be disposed linearly, in any curved shape, and in any geographical location.

Omnidirectional Camera 22

In the omnidirectional camera 22, a plurality of cameras shoot in different directions to generate a 360-degree video image obtained by combining a plurality of captured video images (see NPL 3). The 360-degree video image is a sound field video image that captures the sound field range. The omnidirectional camera 22 shoots in sync with the sound collection of the spherical microphone array 21.

The collected sound recording apparatus 2 transmits the collected sound signal of every microphone collected by the spherical microphone array 21 and the sound field video image generated by the omnidirectional camera 22 to a media playback apparatus 1.

Media Playback Apparatus 1

The media playback apparatus 1 receives the collected sound signals of the microphones and the 360-degree video image from the collected sound recording apparatus 2. The media playback apparatus 1 is a terminal operable by the user and equipped with at least a display and a speaker, such as a smartphone or a tablet terminal, for example.

Figure 3:
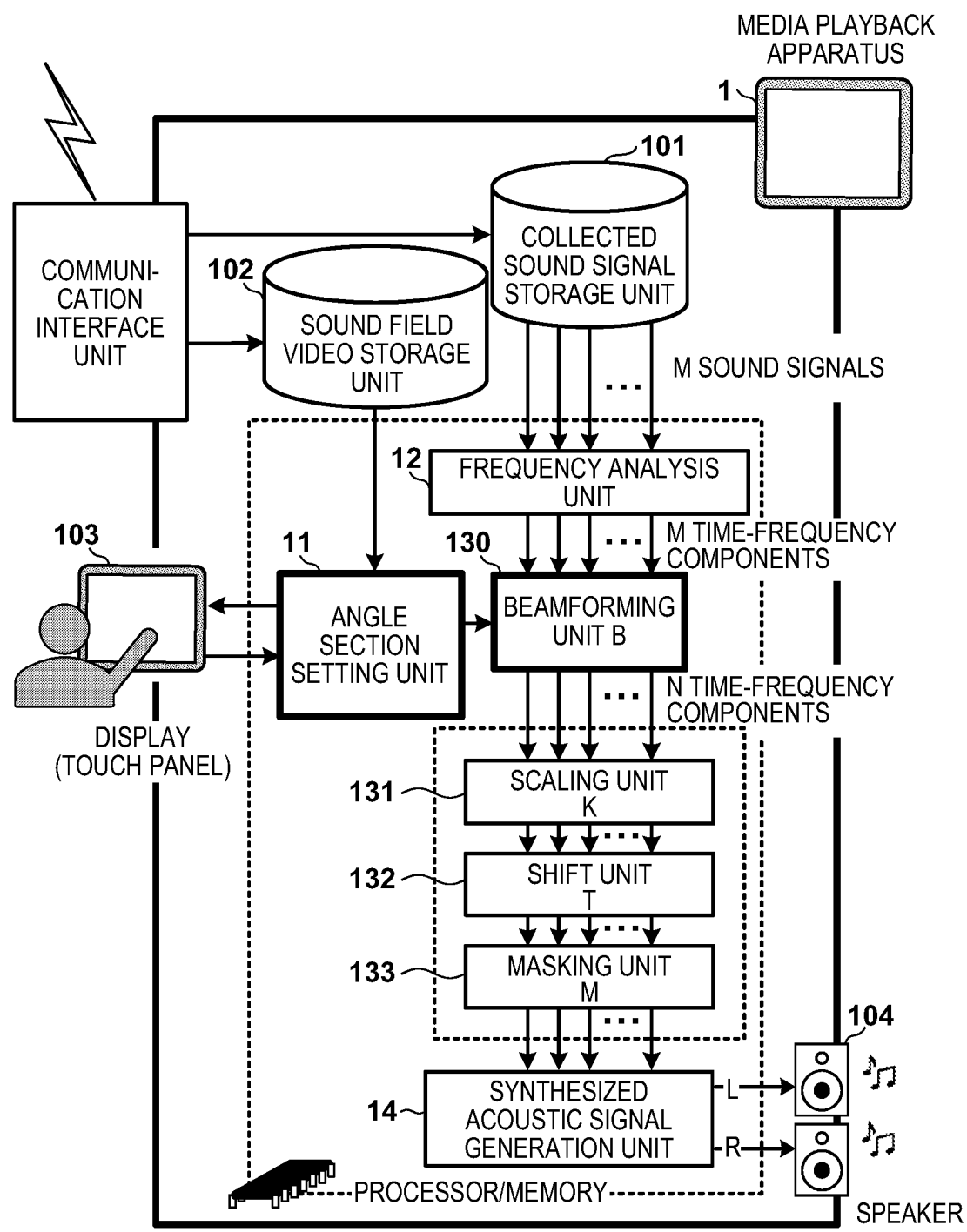
FIG. 3 is a functional configuration diagram of the media playback apparatus in the present invention.

FIG. 3 is a functional configuration diagram of the media playback apparatus in the present invention.

As shown in FIG. 3, the media playback apparatus 1 has a collected sound signal storage unit 101, a sound field video storage unit 102, a display 103 and a set of speakers 104.

The collected sound signal storage unit 101 receives the collected sound signals of the plurality of microphones from the collected sound recording apparatus 1, and stores the collected sound signals. As shown in FIG. 2, the collected sound signals are the signals of the M ($\geq 2$) microphones arranged to face in three-dimensional directions from an identical position. Also, for every collected sound signal, the position and the sound collection direction of the microphone that collected the collected sound signal are also stored in advance.

The sound field video storage unit 102 receives the sound field video image that captures the sound field range from the collected sound recording apparatus 1, and stores the sound field video image.

The display 103 visually plays the video image stored in the sound field video storage unit 102. For example, the display 103 may be the display of a smartphone or tablet, or may be a VR head-mounted display. The display 103 is user-operable with a touch panel device or a pointing device, and is capable of changing the display position and enlarging or reducing the display range with respect to the video image of the visual range that is displayed.

The speakers 104 play the acoustic signal that is ultimately mixed. In the case of stereo, respective synthesized acoustic signals are output by the left channel speaker and the right channel speaker.

Also, the media playback apparatus 1 has an angle range setting unit 11, a frequency analysis unit 12, a beamforming unit 130 and a synthesized acoustic signal generation unit 14. These functional constituent units are realized by causing one or more processors of a computer installed in the media playback apparatus to execute an appropriate program. The flow of processing by these functional constituent units can also be viewed as a media playback method.

Angle Section Setting Unit 11

The angle section setting unit 11 sets an angle section arbitrarily selected by the user at a single sound collection position. The set angle section is output to the beamforming unit 130. Also, the angle section setting unit 11 holds information on the disposition position and sound collection direction of each of the microphones.

Figure 4A:
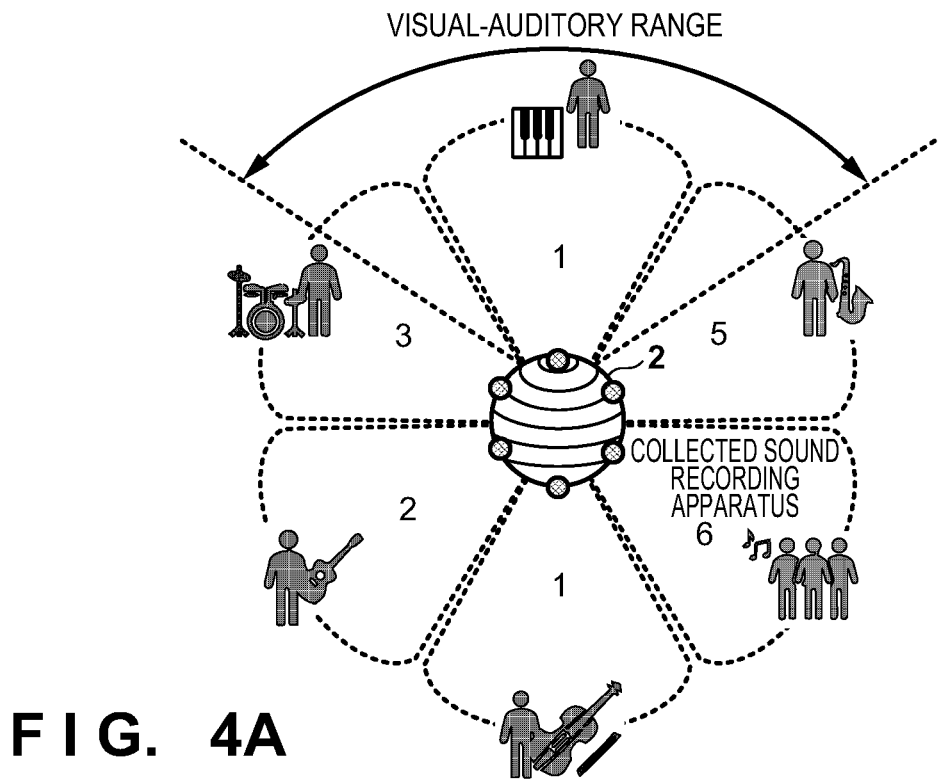
FIG. 4A is an illustrative diagram showing the positional relationship between the visual-auditory range of the user and the sound collection directions of microphones.

FIG. 4A is an illustrative diagram showing the positional relationship between the visual-auditory range of the user and the sound collection directions of the microphones. In this example, the number of microphones is M=6.

As shown in FIG. 4A, the angle range setting unit 11 acquires, from the video image displayed on the display 103, an angle section seen from the collected sound recording apparatus 2 (plurality of microphones). An angle section is acquired, in the case where a plurality of microphones are disposed on a spherical surface as a spherical microphone array. The user is able to perform an operation to set the visual-auditory range of the video image displayed on the display 103 himself or herself That is, setting the angle section means setting the center position that is displayed on the display 103 and the visual-auditory range (section of field of view) thereof.

Also, the angle section may be a section along a straight line or a curved line on which a plurality of microphones are disposed. Even in the case of a circle or a curved line, the interval can be set by arranging the positions of the plurality of microphones on a straight line.

Frequency Analysis Unit 12

The frequency analysis unit 12 executes discrete Fourier transform on each of the M collected sound signals every time interval and converts the collected sound signal to a frequency component $x(\omega)$. The frequency components are output to the beamforming unit 130 as input acoustic signals $(x(\omega)=(x_1, x_2, \ldots, x_M)^T)$.

Beamforming Unit 130

The beamforming unit 130 multiplies the M input acoustic signals $(x(\omega)=(x_1, x_2, \ldots, x_M)^T)$ obtained through conversion by the frequency analysis unit 12 by a beamforming matrix. Multiplying the input acoustic signal $x(\omega)$ by one beamforming matrix generates acoustic signals of two channels.

"Beamforming" refers to signal processing for controlling directionality using a microphone array, as described in NPL 1. Signals from specific directions are enhanced or reduced, by generating interference between signals whose phase or amplitude is controlled by delays and filters, based on the fact that soundwave propagation from the sound source to the microphone differs between the signals. According to the present invention, "fixed beamforming" is applied. Here, a "filter-and-sum beamformer" that changes the relationship between frequency and directionality with a filter is applied.

As will be described later with reference to FIGS. 4B and 5B, beamforming allows collected sound signals (acoustic signals) collected with microphones at positions or from directions (with directionality) that do not actually exist to be obtained. In other words, the acoustic signals that are obtained by beamforming are obtained by "virtual" microphones that have not actually been disposed. In the following description, the acoustic signals that are obtained by beamforming will thus be referred to as acoustic signals obtained by "virtual microphones". Also, the positions or directions of the virtual microphones means the positions or directions of the microphones if the acoustic signals that are obtained by beamforming were collected with actual microphones. The positions or directions of the virtual microphones can be derived by the positions and directions of the microphones used in sound collection and by beamforming matrices.

Note that, in the following description, sound collection direction is used synonymously with directionality. Namely, changing the sound collection direction by beamforming also includes changing only the beam width, while maintaining the same center direction of the beam that is collected by the microphone. Changing the sound collection direction by beamforming also includes changing only the direction of sound collection (center direction of beam) without changing the beam width. Furthermore, changing the sound collection direction by beamforming also includes changing both the beam width and the center direction of the beam.

P number of virtual microphones can be set independently of the M number of microphones that are actually being used. In the present embodiment, P is an integer of two or more, and two virtual microphones positioned adjacent to each other constitute one set.

Note that, in the following description, the positions of the virtual microphones in beamforming are the same as the positions of the M microphones that are actually disposed, and only the directions of the virtual microphones are changed from the sound collection directions of the actual microphones. Accordingly, in the example described below, the P number of virtual microphones is the same as the M number of microphones that are actually disposed. Namely, in this example, P=M=6. Also, in the present embodiment, two adjacent virtual microphones constitute one set. Accordingly, in this example, the N number of sets of virtual microphones is the same as the P number of virtual microphones, namely, N=P=M=6. Note that, in the case where the virtual microphones are disposed linearly rather than in a circle, five sets are configured for the six virtual microphones.

The beamforming unit 130 generates a two-channel acoustic signal $y_n(\omega)$ of an n-th set of virtual microphones (n being an integer from 1 to N) by the following formula.

$$y_n(\omega)=B_n(\omega,b_n)\cdot x(\omega) \tag{1}$$

$x(\omega)$ is the input acoustic signal described above, and $B_n(\omega, b_n)$ is the n-th beamforming matrix, and is a 2×M matrix as shown below.

$$B_n(\omega, b_n) = \begin{pmatrix} bn_{1,1} & \ldots & bn_{1,M} \\ bn_{2,1} & \ldots & bn_{2,M} \end{pmatrix}$$

Figure 4B:
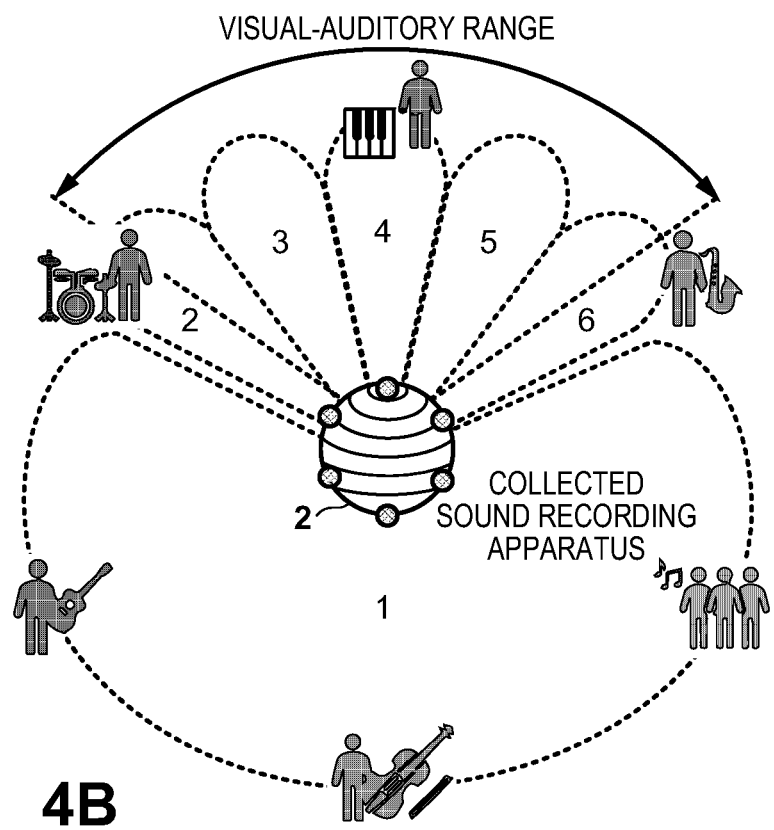
FIG. 4B is an illustrative diagram showing the positional relationship between the visual-auditory range of the user and the sound collection directions of virtual microphones.

As shown in FIG. 4B, the width of the sound field range for every virtual microphone is controlled in relation to the visual-auditory range. Here, the sound collection directions (beam directions) of the virtual microphones are concentrated in the visual-auditory range. For example, the sound collection direction of one virtual microphone can be directed outside the visual-auditory range, and the sound collection direction of P−1 virtual microphones can be directed at equal angles within the visual-auditory range. Naturally, the number of virtual microphones directed outside the visual-auditory range need not be one and may be any number.

Figure 5A:
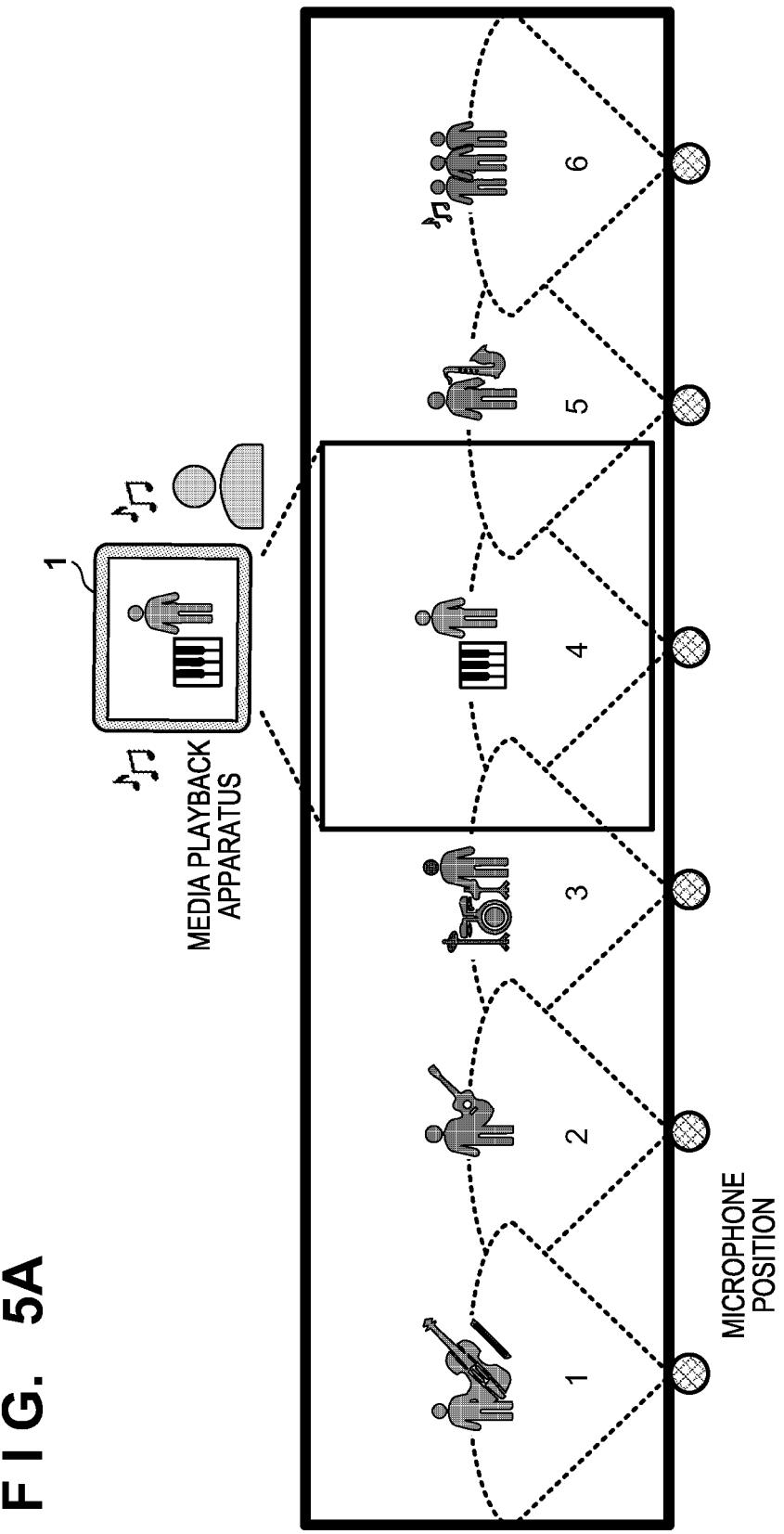
FIG. 5A is an illustrative diagram showing the relationship between the video image range of the sound field and the positions of microphones.
Figure 5B:
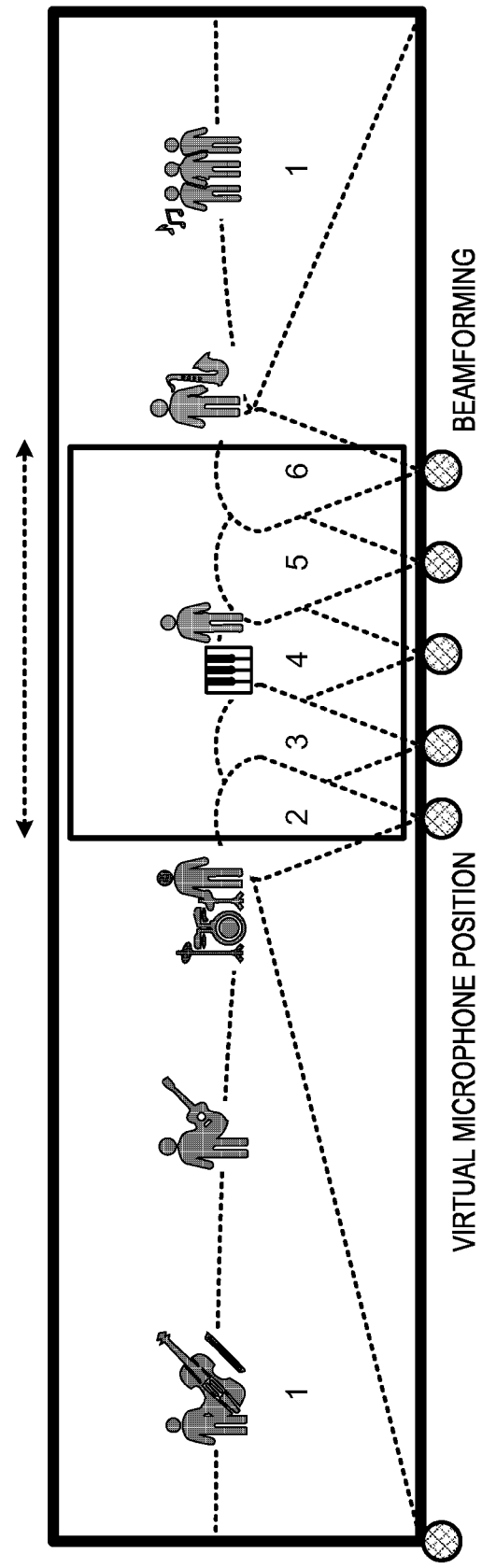
FIG. 5B is an illustrative diagram showing the relationship between the video image range of the sound field and the positions of virtual microphones.

FIGS. 5A and 5B are illustrative diagrams showing the relationship between the video image range of the sound field and the positions of the virtual microphones.

In FIGS. 5A and 5B, a 360-degree video image shot omnidirectionally by the collected sound recording apparatus 2 is laid out in a horizontal plane. The visual-auditory range that is displayed on the display 103 of the media playback apparatus 1 is part (angle section) of the planar 360-degree video image. That is, the angle section corresponds to a horizontal display section of the video image displayed on the display 103.

As shown in FIG. 5A, the positions (sound collection directions) of the microphones are shown in correspondence with FIG. 4A. In FIG. 5B, the positions of the virtual microphones are shown in correspondence with FIG. 4B. Here, the sound collection directions of the virtual microphones are concentrated in the visual-auditory range.

Synthetized Acoustic Signal Generation Unit 14

The synthesized acoustic signal generation unit 14 synthesizes the acoustic signals of all sets of virtual microphones per channel to generate an acoustic signal $y(\omega)$ for every channel. $y(\omega)$ is represented by the following formula.

$$y(\omega) = \Sigma_{n=1}^{N} y_n(\omega) \quad (2)$$

The acoustic signal $y(\omega)$ for every channel is output to a set of speakers.

Figure 6:
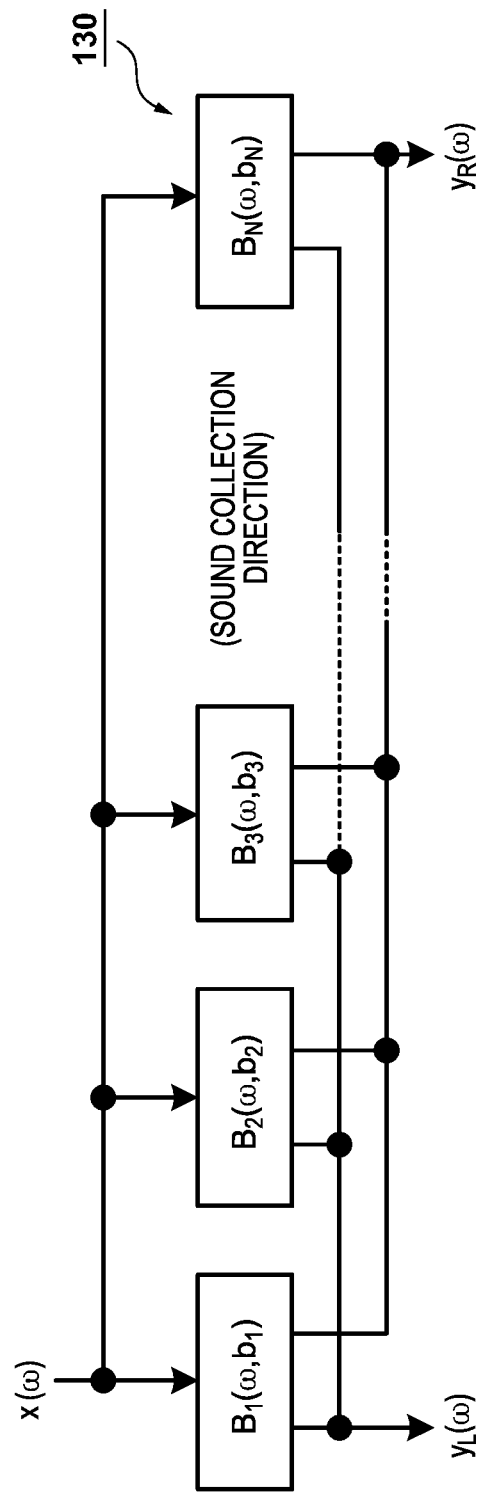
FIG. 6 is a first schematic diagram showing the relationship between input acoustic signals and stereo acoustic signals.

FIG. 6 is a first schematic diagram showing the relationship between the input acoustic signals and stereo acoustic signals.

As shown in FIG. 6, the input acoustic signal $x(\omega)$ from each of the microphones is beamformed by the respective beamforming matrix $B_n$ of the beamforming unit 130. Thereafter, the beamformed acoustic signals are subjected to inverse discrete Fourier transform, and an acoustic signal of the right channel and an acoustic signal of the left channel are output. The acoustic signals output by the beamforming unit 130 are then added together per channel by the synthesized acoustic signal generation unit 14. Note that a configuration may be adopted in which inverse discrete Fourier transform is performed after the output of the beamforming unit 130 has been added together per channel by the synthesized acoustic signal generation unit 14.

OTHER EMBODIMENTS

The description in the aforementioned embodiment focused on beamforming. A scaling unit 131, a shift unit 132 and a masking unit 133 can also be further provided in addition to the beamforming unit 130. These functional constituent units are also described in detail in PTL 2.

Scaling Unit 131

The scaling unit 131 performs, for every set of virtual microphones, multiplication with a scaling matrix (scaling coefficient) that is the scaling ratio of the sound field between the virtual microphones, together with the beamforming unit 130. The scaling matrix is determined from the display range of the video image that appears on the display 103 and the disposition interval of the virtual microphones that is based on the beamforming.

$$K_n(\omega, k_n) = \begin{pmatrix} a \exp(-jb\Phi(\omega)) & b \exp(ja\Phi(\omega)) \\ b \exp(-ja\Phi(\omega)) & a \exp(jb\Phi(\omega)) \end{pmatrix}$$

$$(a, b) = \left(\frac{1+k_n}{2}, \frac{1-k_n}{2}\right)$$

$$\Phi(\omega) = \arg(x_n(\omega)) - \arg(x_{n+1}(\omega)) + 2\pi\phi(\omega)$$

$K_n(\omega, \kappa_n)$: scaling matrix for enlarging or reducing the sound field $\kappa_n$: scaling (enlarging/reducing) coefficient (0 to 2) for controlling the sound field range $\kappa_n=1$: no change, $\kappa x_n<1$: reduced, $\kappa_n>1$: enlarged$\phi(\omega)$: principal value of deflection angle of two acoustic signals (integer where $-\pi<\phi(\omega)\leq\pi$)

For example, if the user performs an operation to enlarge the center of the video image that is displayed on the display 103, more virtual microphones are concentrated near the center, and $\kappa_n$ in the center is increased and $\kappa_n$ on the left and right is reduced.

Shift Unit 132

The shift unit 132 performs, for every set of virtual microphones, multiplication with a shift matrix (shift coefficient) that is the shift amount of left-right movement between the virtual microphones, together with the beamforming unit 130. The shift matrix is determined from the display range of the video image that appears on the display 103 and the disposition interval of the virtual microphones that is based on the beamforming.

$$T_n(\omega, \tau_n) = \text{diag}\left(\exp\left(\frac{j\omega\tau_n}{2}\right), \exp\left(\frac{-j\omega\tau_n}{2}\right)\right)$$

$T_n(\omega, \tau_n)$: shift matrix for moving sound field left/right
$\tau_n$: shift amount $(-c\leq\tau_n\leq c$, c: time constant)
$\tau_n<0$ (negative value): moved left, $\tau_n>0$ (positive value): moved right For example, if the user performs an operation to enlarge the center of the video image that is displayed on the display 103, more virtual microphones are concentrated near the center, and $\tau_n$ on the left side is set to a negative value for left movement and $\tau_n$ on the right side is set to a positive value for right movement, without changing $\kappa_n$ in the center.

Masking Unit 133

The masking unit 133 performs, for every set of virtual microphones, multiplication with a masking matrix (attenuation coefficient) that is the attenuation of the sound field between the virtual microphones, together with the beamforming unit 130. The masking matrix is determined from the display range of the video image that appears on the display 103 and the disposition interval of the virtual microphones that is based on the beamforming.

$M_n(\omega, m_n(\omega)) = \text{diag}(m_n(\omega), m_{n+1}(\omega))$
$M_n(\omega, m_n(\omega))$: masking matrix for realizing selective composition of sound fields
between a plurality of channels
$m_n(\omega)$: masking attenuation coefficient (0 to 1)
  $m_n(\omega)=1$: passes, $m_n(\omega)<1$: suppressed, $m_n(\omega)=0$: does not pass The masking attenuation coefficient has a distance attenuation effect, taking into account the selective composition of sound fields and the directional pattern of the microphones.

FIG. 7 is a second schematic diagram showing the relationship between the input acoustic signals and stereo acoustic signals.

As shown in FIG. 7, after processing by the beamforming unit 130, the scaling unit 131, the shift unit 132 and the masking unit 133, the input acoustic signal $x(\omega)$ from each of the microphones is subjected to inverse discrete Fourier transform, and an acoustic signal of the right channel and an acoustic signal of the left channel are output. The acoustic signals output by the masking unit 133 in the final stage are added together per channel.

FIG. 8 is an illustrative diagram showing the positional relationship between virtual microphones and sound sources.

FIG. 8 shows the case where sound sources C and D are located between virtual microphones A and B.
  Input acoustic signal A of virtual microphone A
  Input acoustic signal B of virtual microphone B
  Output acoustic signal L of left channel
  Output acoustic signal R of right channel
  The settings of reference numeral 81 are as follows.
  Masking attenuation coefficients: $m_1=1$, $m_2=1$
  Shift amount: $\tau=0$
  Scaling coefficient: $\kappa=1$
In this case, matrices M and T do not change the input acoustic signals A and B, and the output acoustic signals will be as follows.
  Output acoustic signal R=input acoustic signal A
  Output acoustic signal L=input acoustic signal B
  Thus, when speakers are respectively placed at the positions of the virtual microphones A and B and driven by the acoustic signals R and L, the sound field range in the direction in which the virtual microphones A and B are disposed will be equivalent to the sound collection range of the virtual microphones A and B.

The position of the center dashed line where the sound sources C and D of reference numeral 81 are located is an intermediate position between the virtual microphones A and B. In this case, the positions of the sound images of the sound source C and the sound source D that serve as the output acoustic signals are the same as the disposition positions of the sound source C and the sound source D.

The settings of reference numeral 82 are as follows.
Masking attenuation coefficients: $m_1=1$, $m_2=1$
Shift amount: $\tau=0$ Here, the sound field range of the scaling coefficient $\kappa<1$ will be shorter than the sound field range of $\kappa=1$. At this time, when the speakers disposed at the positions of the virtual microphones A and B are driven with the output acoustic signals R and L, the position of the sound image of the sound source C will be the same as the disposition position of the sound source C, that is, the center dashed line. However, the position of the sound image of the sound source D will be closer to the center dashed line than the disposition position of the sound source D. Conversely, the sound field range of the scaling coefficient $\kappa>1$ will be longer than the sound field range of $\kappa=1$.

As indicated by reference numerals 81 and 82, when $\tau=0$, the matrix T has no effect on the input acoustic signals A and B. On the other hand, when $\tau\neq 0$, the matrix T causes the phases of the input acoustic signals A and B, which have the same absolute value but different signs, to change. Thus, the positions of the sound images shift in the direction of the virtual microphone A or B according to the value of $\tau$. Note that the shift direction is determined according to whether $\tau$ is positive or negative, and the shift amount is larger as the absolute value of $\tau$ increases.

Reference numeral 83 indicates the sound field range when $\tau\neq 0$ is set after having set K to obtain the sound field range of reference numeral 82. The positions of the sound images of the sound sources C and D shift more to the left than in the case of reference numeral 82.

Note that, in FIG. 8, it is assumed for illustrative purposes that the speakers are placed at the positions of the virtual microphones A and B, but the two speakers of the R channel and L channel can be installed at any distance. In this case, the sound field range also depends on the disposition distance of the speakers.

Figure 9A:
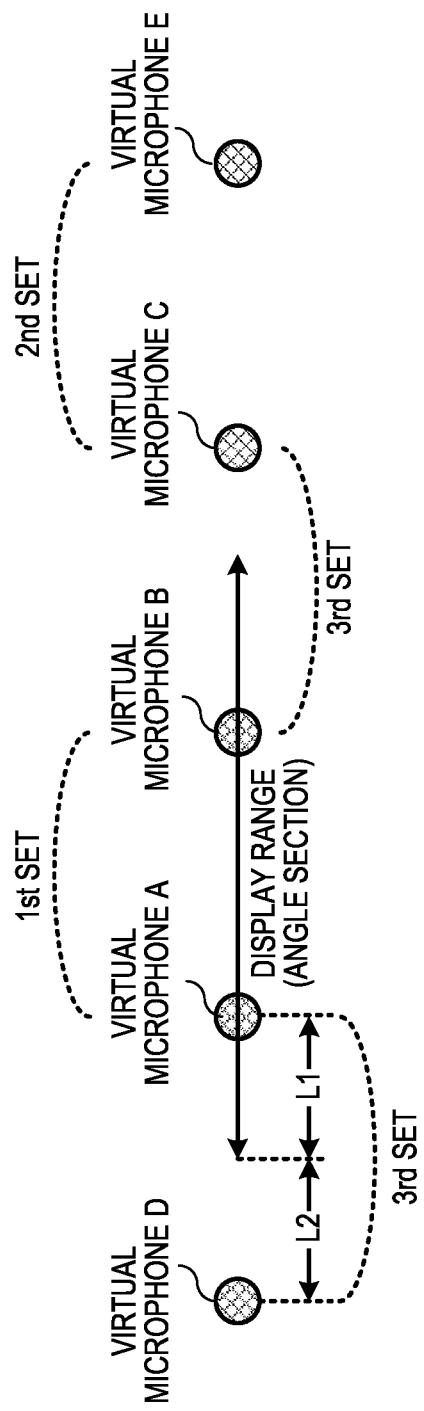
FIG. 9A is an illustrative diagram showing sets of virtual microphones.
Figure 9B:
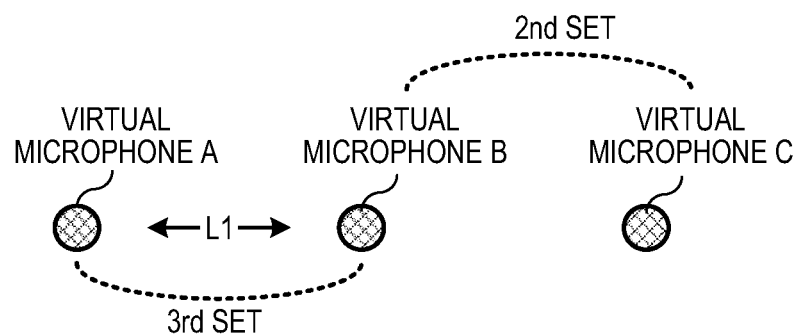
FIG. 9B is an illustrative diagram showing sets of virtual microphones.
Figure 9C:
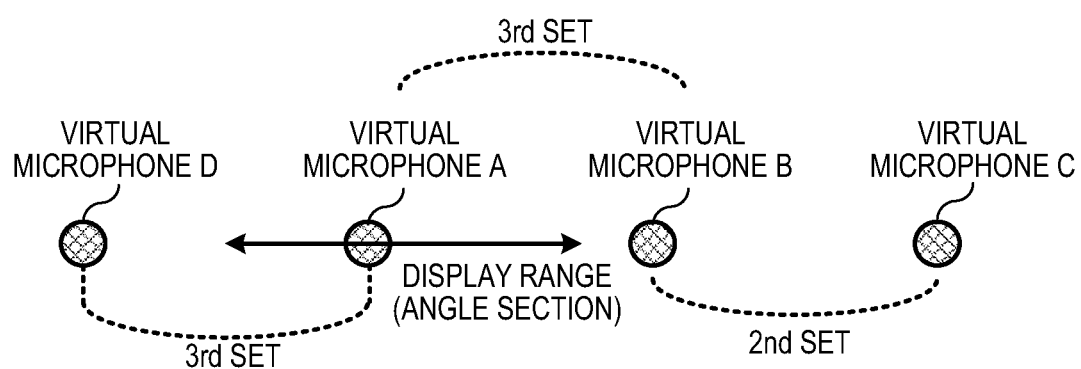
FIG. 9C is an illustrative diagram showing sets of virtual microphones.

FIGS. 9A to 9C are illustrative diagrams showing sets of virtual microphones.

Initially, it is determined whether at least one virtual microphone is included in the angle sectionl of the visual-auditory range. FIG. 9A shows the case where at least one virtual microphone is included in the angle section.

1st Set: set in which both virtual microphones are included in the angle section
2nd Set: set in which both virtual microphones are not included in the angle section
3rd Set: set in which one virtual microphone is included in the angle section and the other virtual microphone is not included in the angle section
L1: overlapping range from the position of the one virtual microphone to the angle section boundary
L2: non-overlapping range from the position of the other virtual microphone to the angular section boundary FIG. 9B shows the case where none of the virtual microphones are included in the angle section. In this case, the sets are as follows.

3rd Set: set in which the virtual microphones are closest to the angular section
2nd Set: set of virtual microphones other than the above third set With regard to the first set, $\tau=0$, $\kappa=1$, $m_A=0$ and $m_B=0$, for example. That is, the sound field is not scaled, shifted or attenuated. On the other hand, with regard to the third set, $\kappa$ and $\tau$ are configured such that the sound field range depends on the overlapping interval. That is, the scaling coefficient $\kappa$ of the third set is configured based on the length L1 of the overlapping interval. Specifically, the scaling coefficient $\kappa$ for the third set is determined to obtain a scaling ratio of L1/L, where L is the distance between the two virtual microphones of the third set. The scaling coefficient $\kappa$ of the third set is thereby determined such that the sound field range is shortened as the length of the overlapping interval of the third set decreases. Also, the shift coefficient i of the third set is configured such that the center position of the sound field approaches the center position of the overlapping interval. Thus, the shift coefficient of the third set is determined according to the distance between the center of the disposition position of the two virtual microphones and the center of the overlapping interval.

Furthermore, the attenuation coefficients of the two virtual microphones of the third set are set to $m_A=1$ and $m_B=1$. Alternatively, in the third set, the attenuation coefficient of the virtual microphone that is included in the angle section is set to the same value as the attenuation coefficients of two virtual microphones of the first set. The attenuation coefficient of the virtual microphone that is not included in the angle section is thereby configured such that the attenuation is larger than the attenuation of the virtual microphone that is included in the angle section. Alternatively, the attenuation coefficient of the virtual microphone of the third set that is not included of the angle section is configured such that the attenuation is greater as the length of the non-overlapping interval, that is, a shortest distance L2 from the disposition position of the microphone to the angle section of the visual-auditory range, increases.

With regard to the second set, $\tau=0$ and $\kappa=1$, for example, similarly to the first set. Here, the attenuation coefficients of the two virtual microphones are set to values at which the attenuation will be greater than the attenuation coefficients set for the microphones of the first and third sets. For example, the attenuation coefficients of the two virtual microphones of the second set are set to a value at which the attenuation is maximized, that is, to 0 or a predetermined value close to 0.

In FIG. 9C, the sets are as follows.
3rd set: set of virtual microphones A and B
3rd set: set of virtual microphones A and C
2nd set: other sets Here, since the attenuation on the virtual microphones of the second sets a high, hardly any of the acoustic signals of these sets is included in the output acoustic signals R and L.

As described in detail above, according to an apparatus, program and method of the present invention, the collected sound signals of a plurality of microphones can be mixed, such that the user does not sense a divergence between the visual video image range and the auditory sound field range.

According to the present invention, the user can be presented with interactive viewing of a 360-degree moving image in which the sound images have high localization accuracy.

OTHER EMBODIMENTS

The present invention is also realizable with processing that involves supplying a program that realizes one or more of the functions of the above-described embodiment to a system or apparatus via a network or storage medium, and one or more processors in a computer of the system or apparatus reading out and executing the program. The present invention is also realizable by a circuit (e.g., ASIC) that realizes one or more of the functions.

The invention is not limited to the foregoing embodiments, and various variations/changes are possible within the spirit of the invention.

What is claimed is:

1. An apparatus for mixing collected sound signals, comprising:
one or more processors; and
one or more memory devices configured to store M collected sound signals, each of which is collected by a microphone of M microphones, and one or more computer programs executable by the one or more processors, M being 2 or more, wherein
the one or more programs, when executed by the one or more processors, cause the apparatus to function as:
an angle section setting unit configured to set an angle section at a single sound collection position, selected by a user;
a frequency analysis unit configured to convert each of the M collected sound signals into a frequency component;
a beamforming unit configured to multiply M frequency components obtained through conversion by the frequency analysis unit by respective beamforming matrices to generate a plurality of acoustic signals of two channels; and
a synthesized acoustic signal generation unit configured to synthesize the acoustic signals per channel and outputting an acoustic signal for every channel.

2. The apparatus according to claim 1, wherein
the one or more memory devices are further configured to store a video image shot at a same time as recording of the M collected sound signals, and
the apparatus further comprises:
a display for visually playing the video image stored in the one or more memory devices; and
a speaker for every channel for playing the acoustic signal output by the synthesized acoustic signal generation unit.

3. The apparatus according to claim 2,
wherein the display is configured to enlarge or reduce the video image displayed on the display, in response to a user operation on a touch panel device or a pointing device, and
the angle section setting unit is further configured to set the angle section, based on an angle seen from the microphones in the video image displayed on the display.

4. The apparatus according to claim 3,
wherein the M microphones are disposed facing omnidirectionally from a single sound collection position, and
the video image is recorded by a camera capable of shooting omnidirectionally.

5. The apparatus according to claim 4,
wherein the video image displayed on the display is obtained by laying out an omnidirectionally shot video image in a horizontal direction of the display, and
the angle section depends on a horizontal display section of the video image displayed on the display.

6. The apparatus according to claim 5, wherein
the one or more programs, when executed by the one or more processors, further cause the apparatus to function as:
a scaling unit configured to multiply each of the acoustic signals of the two channels by a scaling matrix for scaling a sound field, and
wherein the scaling matrix is determined from a display range of the video image displayed on the display and a disposition interval of virtual microphones that is based on the beamforming.

7. The apparatus according to claim 5, wherein
the one or more programs, when executed by the one or more processors, further cause the apparatus to function as:
a shift unit configured to multiply each of the acoustic signals of the two channels by a shift matrix for shifting a sound field, and
wherein the shift matrix is determined from a display range of the video image displayed on the display and a disposition interval of virtual microphones that is based on the beamforming.

8. The apparatus according to claim 5, wherein
the one or more programs, when executed by the one or more processors, further cause the apparatus to function as:
a masking unit configured to multiply each of the acoustic signals of the two channels by a masking matrix for attenuating a volume, and
wherein the masking matrix is determined from a display range of the video image displayed on the display and a disposition interval of virtual microphones that is based on the beamforming.

9. A non-transitory computer-readable storage medium storing the one or more programs, the one or more programs, when executed by one or more processors of an apparatus that stores M collected sound signals, each of which is collected by a microphone of M microphones, wherein M being 2 or more, cause the apparatus to function as:
an angle section setting unit configured to set an angle section at a single sound collection position, selected by a user;
a frequency analysis unit configured to convert each of the M collected sound signals into a frequency component;
a beamforming unit configured to multiply M frequency components obtained through conversion by the frequency analysis unit by respective beamforming matrices to generate a plurality of acoustic signals of two channels; and
a synthesized acoustic signal generation unit configured to synthesize the acoustic signals per channel and outputting an acoustic signal for every channel.

* * * * *